Sept. 10, 1940. L. G. DANIELS Re. 21,555

VALVE

Original Filed Oct. 12, 1933 3 Sheets-Sheet 1

Inventor:
Lee G. Daniels

By
Wilson, Dowell, McCanna & Hintercorn
Attys.

Sept. 10, 1940. L. G. DANIELS Re. 21,555

VALVE

Original Filed Oct. 12, 1933 3 Sheets-Sheet 2

Inventor:
Lee G. Daniels

By
Wilson, Dowell, McCanna & Winterson
Attys.

Sept. 10, 1940. L. G. DANIELS Re. 21,555

VALVE

Original Filed Oct. 12, 1933 3 Sheets-Sheet 3

Inventor:
Lee G. Daniels

By Wilson, Dowell, McCanna & Mintzer Attys.

Reissued Sept. 10, 1940 Re. 21,555

UNITED STATES PATENT OFFICE 21,555

VALVE

Lee G. Daniels, Rockford, Ill.

Original No. 2,093,692, dated September 21, 1937, Serial No. 693,330, October 12, 1933. Application for reissue May 15, 1939, Serial No. 273,760

35 Claims. (Cl. 277—24)

This invention relates to valves and more particularly a new and improved multi-port, rotary plate type valve so designed and constructed that it may be used interchangeably on water softeners and filters.

In another application, Serial No. 560,303, I have disclosed a rotary plate type valve in which the plate seats on a ported gasket and has means for raising the plate off the gasket when it is desired to shift the valve to another position. It is the principal object of my present invention to provide a valve of a similar type but constructed to provide separate, small gaskets on the plate for engagement with seat rings on the body, thus making it more practical to provide larger sizes of valves of this type and enabling replacement of gaskets at comparatively low cost. It is a further object of this invention to provide novel means for raising, turning and seating the plate under spring pressure, the said means being so constructed that the spring pressure does not function as a drag upon the turning of the plate, whereby to facilitate manual operation of the valve, especially in the larger sizes.

Another important object consists in the provision in a valve of the kind mentioned of a plunger arranged to be raised and lowered with the rotary plate to close and open inlet ports through which the water or other fluid is delivered to the valve, whereby to prevent any flow during the shifting of the rotary plate.

Still another object consists in the provision of a poppet type valve spring pressed toward closed position over one of the ports in the rotary plate and arranged to be opened by engagement of rods mounted in the body in the seating of the plate in different positions, whereby to enable the automatic closing off or opening of the port in the rotary plate accordingly as the rods for operating the valve are omitted or included in the body passages. The valve operating rods are preferably threaded in the valve body for adjustment toward or away from the poppet valve, whereby to vary the opening of said valve and accordingly regulate the flow through the valve, and thus utilize the poppet valve both as a shut-off valve and restriction valve.

Another object is to provide an adjustable restriction valve in the drain passage in the body, adjustable from the outside of the body so as to cut down the flow during back washing, as desired, in the case of a softener or filter installation.

The invention is illustrated in the accompanying drawings, in which—

Figures 1 and 2 are longitudinal cross-sections in planes corresponding to the lines 1—1 and 2—2 of Fig. 4, the rotary plate being shown unseated in Fig. 2;

Fig. 1*a* is a fragmentary view of one end of Figure 1 showing the hand lever in an intermediate position between those shown in Figs. 1 and 2;

The same reference numerals are applied to corresponding parts throughout the views.

Figure 1:
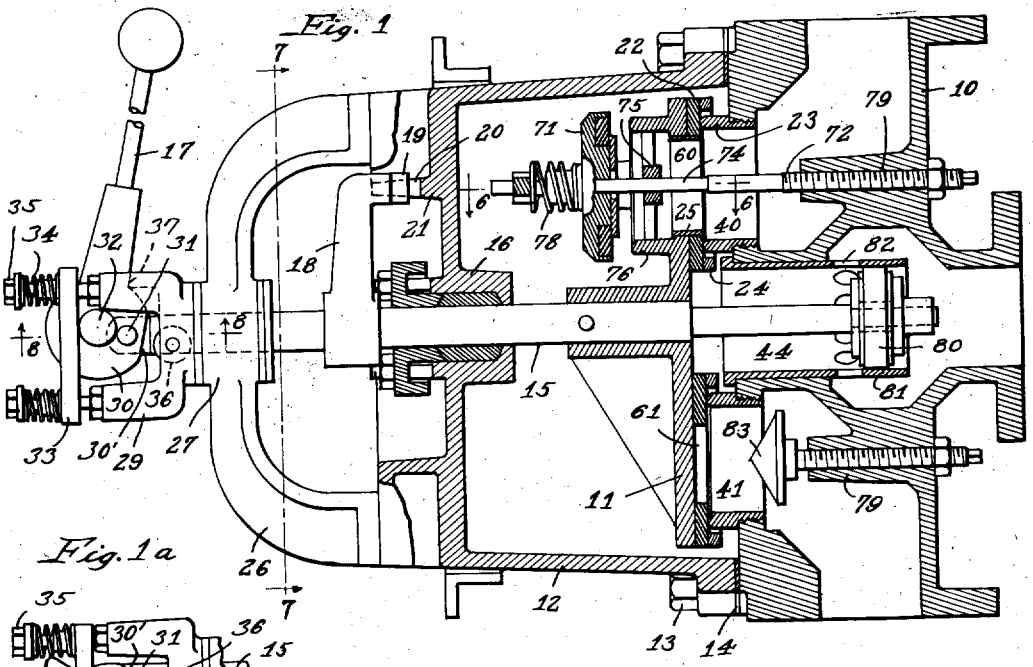

The valve of my invention, as stated above, has been especially designed for use interchangeably on water softeners and filters. However, it is adapted for a variety of purposes and any reference hereinafter to water softening or filtering should not be regarded in any sense as imposing a limitation on the application of this invention. The valve is suitable for industrial purposes and wherever it is desired to control the flow of any fluid in a similar manner. In the present case, as will soon appear, the valve when used with a water softener controls the flow of water for softening and back washing, and controls the flow of brine and water in salt washing and rinsing. In its application to a filter, the valve controls the flow of water in filtering and back washing and also permits washing out of raw water from the filter left under the filter bed as a result of the back washing, before the filter is connected with the service line.

Referring to the drawings, the cast body of the valve is indicated by the numeral 10 and has a plurality of ports and passages therein for cooperation with ports and passages in a rotary stem plate 11, whereby to control a system of communication between pipes connected with the body and communicating with the passages thereof. The body 10, in other words, constitutes the stator and the stem plate 11 the rotor. The plate 11 is enclosed by a cover 12 fastened suitably by bolts 13 onto the body 10, with a gasket 14 compressed between the parts to prevent leakage. A valve stem 15 projects forwardly from the center of the plate 11 through a suitable stuffing box 16 provided in the cover, whereby to permit turning the plate by means of a hand lever 17. The lever 17, as will soon appear, is capable of operation in such a way as to unseat the plate 11 by means of the stem 15, and then turn the plate to a desired position, and reseat the same. An arm 18 extends radially from the stem 15 outside the cover 12 and has a tooth 19 on the outer end thereof adapted to be received in any one of a plurality of notches 20 formed in an annular flange 21 projecting from the cover, whereby to indicate the position of the plate and lock the plate in a selected position against turning before unseating. The cover is preferably provided with numbered tabs in radial alignment with the notches 20 so that the operator can readily tell in what position the valve is set. Valves of this general type, known as rotary plate type valves, have usually been constructed with the plate held down in direct metal-to-metal contact with the flat seat on the body, with the result that when the plate was turned the parts became scored and leakage resulted. It was then only a question of time when the leakage would become excessive and repair or replacement would be necessary, which meant not only considerable expense but the annoyance of interrupted service. By having the plate arranged to be unseated before it is turned, as herein disclosed, the objection as to scoring is avoided. Furthermore, I am thereby enabled to utilize gaskets 22 of rubber or other suitable material on the rotary plate around the ports thereof for engagement with metallic seat rings 23 suitably mounted in the ports in the body 10. In that way, I secure a good leak-proof fit for the plate on the body without necessitating heavy pressure on the plate as was heretofore the case where a metal-to-metal contact was relied upon. The gaskets 22 are suitably held in place by rings 24 fastened by screws to the plate 11. Bushings 25 inserted in the ports in the plate project from the plate sufficiently to center the gaskets and keep the latter from spreading and getting out of shape as a result of the compression thereof onto the seats. It is, of course, a matter of no great expense to replace these individual gaskets and this design is, therefore, ideal for the larger sized valves. The seat rings 23 can also be produced at comparatively low cost and are threaded or otherwise held in place for easy removal and replacement should that ever become necessary.

Figure 8:
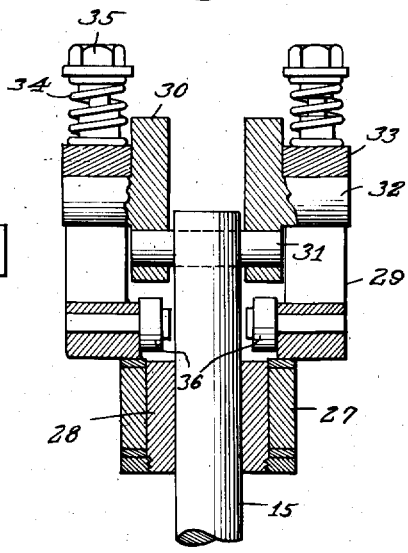
Fig. 8 is a section on the line 8—8 of Figure 1.

A yoke 26 is mounted on the end of the cover 12 and has a center bearing 27 through which the end of the stem 15 projects and in which the neck 28 of a rotary head 29 is swiveled (see Fig. 8). The hand lever 17 has a clevis 30 provided on the end thereof in which the end of the stem 15 is pivoted by means of a cross-pin 31. The sides of the clevis are of substantially circular form, as shown, and trunnions 32 project from opposite sides at the center with the cross-pin 31 at a predetermined radius with respect thereto. These trunnions have plates 33 bearing thereon under pressure of coiled compression springs 34 carried on bolts 35 mounted on the head 29 and serving as guides for the plates 33. When the lever 17 is in the position shown in Figure 1, the pressure of the springs 34 is transmitted through the stem 15 endwise to the plate 11 to seat the gaskets 22 under a certain pressure onto the seat rings 23. The clevis 30 has flats 30′ provided on the periphery thereof at the proper point to insure ample clearance between the clevis and rollers 36 mounted on the head 29, in this particular position of the lever, whereby to insure proper seating of the plate 11 regardless of whether the gaskets thereon are relatively thick or thin. When the lever 17 is swung in a counterclockwise direction from the position of Figure 1 toward the position of Fig. 2, the clevis 30 rides on the rollers 36, so that the spring pressure is no longer active against the stem and plate but is transmitted directly to the head 29. The movement of the lever results in endwise movement of the stem 15 to unseat the plate 11, as indicated in Fig. 2. When the lever 17 is in the position of Figure 1, the trunnions 32 are substantially in dead center relationship with respect to the cross-pin 31 and rollers 36, the trunnions 32 being preferably a trifle past dead center so that the lever is urged against a stop 37 provided on the head, with the result that there is a definite end thrust on the stem 15 at all times to keep the plate 11 seated. In the swinging of the lever 17 from the position to Figure 1 to that of Fig. 2, it passes through the position illustrated in Fig. 1*a*, at which point the plate 11 is being unseated. At this point it will be observed that the pin 31 is on the center line *x* and the trunnions 32 are on the center line *z* on opposite sides of the fulcrum line *y* which passes through the point of contact of the clevis 30 with the rollers 36. The springs 34, which hitherto acted to hold the plate 11 seated under pressure, are now actually exerting a force in a direction to aid in the unseating of the plate, so that the operator does not have to exert as much force on the lever 17 as would otherwise be necessary. It is only through a very small angle of movement of the lever 17 that the operator has to work against the pressure of the springs 34, and that is in moving the lever from the position of Figure 1 toward that of Fig. 1*a* enough to bring the trunnions 32 past a dead center relative to the stem 15. As soon as the trunnions 32 pass the fulcrum line *y*, the spring pressure becomes active in the opposite direction to assist in unseating the plate. Once the lever 17 has been swung to the position shown in Fig. 2, it is a simple matter to turn the plate 11 to any desired position, the tooth 19 being moved clear of the flange 21 and being adapted for entry into any selected notch. The operator simply turns the stem 15 by means of the lever 17, using the head 29 as a swivel support, and when the tooth 19 is directly over the proper notch, the lever 17 is then swung back to its original position to seat the plate. There is no drag upon the operation inasmuch as the spring pressure is transferred from the plate to the head when the lever is swung over to the position of Fig. 2, so that the manual operation of even the largest valve is easily accomplished by hand.

In the description thus far, I have purposely omitted reference to any specific port arrangement in the body 10, as well as any specific arrangement of ports and passages in the plate 11 for the reason that those arrangements will be varied naturally according to different requirements. The number of ports and passages provided will, in any case, depend upon the number of operating positions and the number of pipe connections whose intercommunication is to be controlled by the valve. The specific arrangement herein illustrated is provided for the application of the valve interchangeably to a water softener or filter. Four ports, numbered 40—43 are provided in the body 10 in equally circumferentially spaced relation and at the same radius with respect to a central port 44. Pipes are suitably connected to the flanged portions of the body in communication with the ports 40—44. There are other smaller ports in the body 10, numbered 45, 46 and 46′ disposed at the same radius with respect to the center port 44. The port 45 is midway between the ports 42 and 43 and communicates with the port 43 through a ports. The port 46′ is midway between the ports 40 and 43 and is independent of these ports. The port 46′ is midway between the ports 41 and 42 and is likewise independent thereof. As an aid to understanding the operation of the valve in the case of its application to a water softener, I have diagrammatically indicated in Fig. 3 by single lines a supply pipe 47 for conducting raw water to the valve as having communication with port 44; another pipe 48 leading to a service system, having communication with port 43; pipe 49 communicating with port 40 and extending to the top of a softener tank 50; pipe 51 communicating with port 42 and connected with the bottom of the softener 50; pipe marked "Drain" communicating with port 41 and extending to the sewer or any other suitable drain receptacle, and another pipe communicating with port 46 and discharging into an injector 54 whose outlet is in communication with the aforesaid pipe 49 and which is arranged to draw brine from the brine tank 55 through a pipe 56 when a hand valve 57 is opened. Another pipe 53′ is shown extended from the port 46′ to the brine tank 55.

Figure 4:
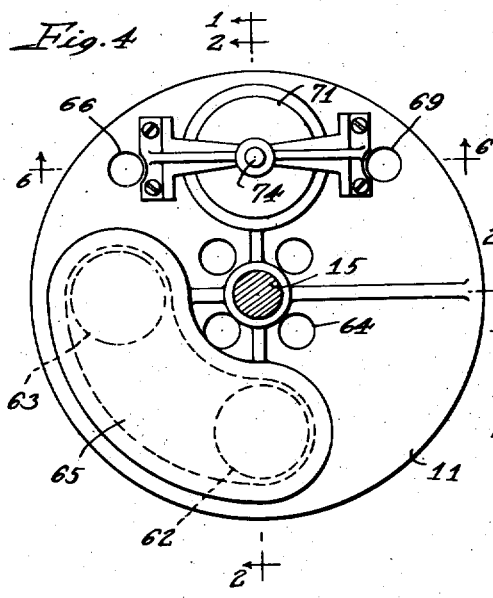
Fig. 4 is a cross-section on the line 4—4 of Fig. 2 giving a plan view of the rotary plate.
Figure 5:
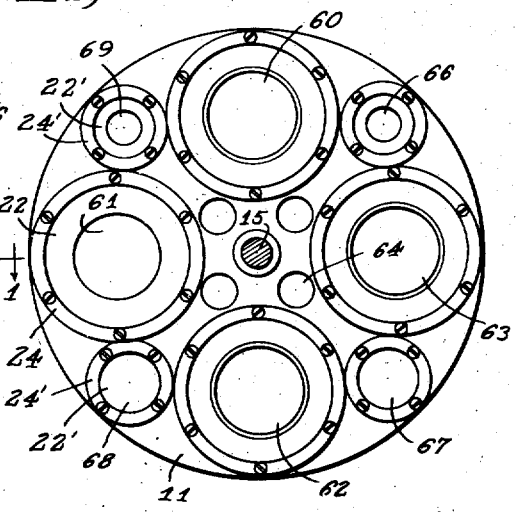
Fig. 5 is a view of the other side of the plate.
Figure 6:
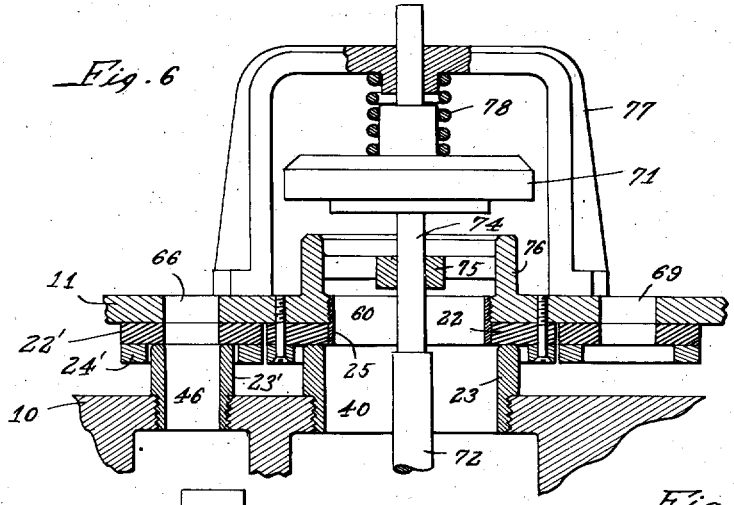
Fig. 6 is a section on an enlarged scale on the line 6—6 of Fig. 4.
Figure 7:
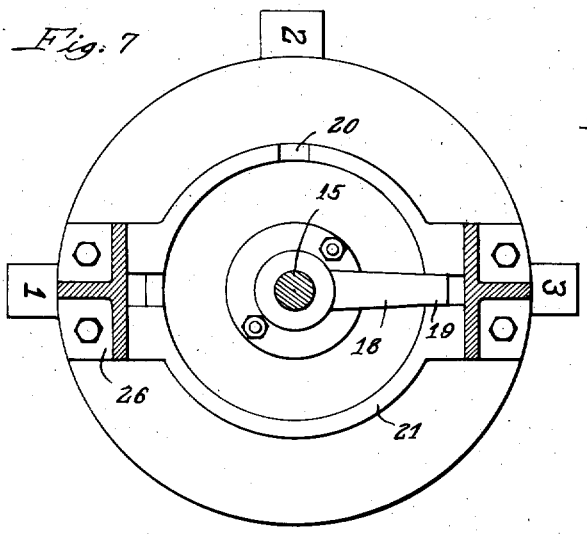
Fig. 7 is a section on the line 7—7 of Figure 1.

The rotary plate 11 has four ports, numbered 60—63, correspondingly arranged to the ports 40—43 in the body, and a plurality of small ports 64 clustered around the stem 15 corresponding in location to the port 44 in the body. That is to say, the ports 60—63 are all disposed at the same radius with respect to the stem 15 and register with the ports 40—43 in the different positions assumed by the plate, its positions being a quarter turn or half turn apart, as appears from the fact that there are three notches 20 disclosed in Fig. 7 in the indexing flange 21 to receive the tooth 19. The port 61 is a blind port, as clearly appears in Figure 1, and also from the fact that it does not show in the plan view of the plate in Fig. 4. The ports 62 and 63 are interconnected by a hollow boss 65, as shown in Figs. 2 and 4. Four other ports half way between the ports 60—63, numbered 66—69, are provided on another radius with respect to the stem 15, the radius being the same as that for the ports 45, 46 and 46′ in the body, whereby to provide for registration of these ports in the plate with those in the body in different positions of the plate. The ports 66 and 69 go through the plate, as appears in Fig. 4, but ports 67 and 68 are blind. Ported gaskets 22′ are provided for the ports 66 and 69 fastened in place by rings 24′, similarly as the gaskets 22 previously described. The gaskets at 67 and 68 have no ports but are held in place by rings in a similar manner. The ports 45, 46 and 46′ have small seat rings 23′ for engagement with the gaskets 22′ similarly as the rings 23 engage gaskets 22, see Fig. 6. The fact that there are four large gaskets 22 to engage the four seat rings 23, and four small gaskets 22′ to engage the seats 23′ insures seating of the plate 11 in exactly the same way in every position and each seat ring will find a mating, ring-shaped depression in a gasket when the plate is seated. There can be no question, therefore, as to the plate seating with a water tight fit in each and every position.

Figure 1A:
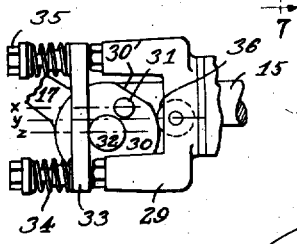
Figure 2:
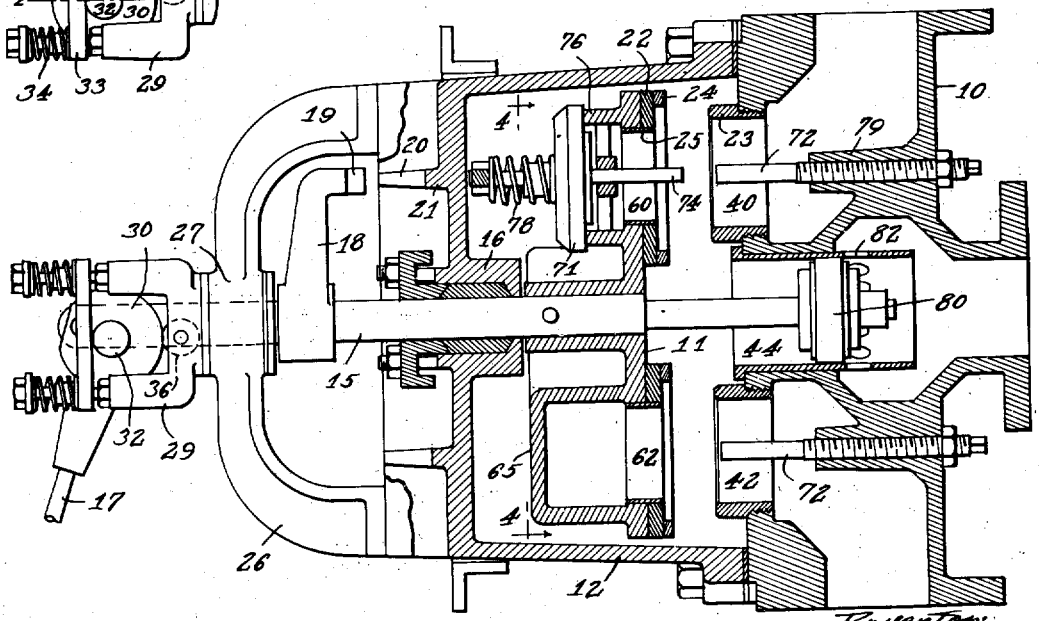

In operation, assuming that the valve is being used in connection with a softener 50 and brine tank 55, and that the plate 11 is in softening position, as indicated in Figure 1, hard or raw water is delivered through the pipe 47 and flows through ports 44, 64, 60 and 40 into the pipe 49 for passage downwardly through the bed of water softening material in the softener 50. The softened water discharged from the bottom of the softener through pipe 51 is conducted through ports 42 and 62, and through passage 65 through ports 63 and 43 to the pipe 48 leading to the service system. The softening operation is continued until the bed of water softening material requires regeneration, whereupon the lever 17 is operated to shift the valve a half turn in a clockwise direction to the No. 1 position (see Fig. 7), to subject the bed of water softening material to a back wash, that is, an upflow of water for the purpose of getting rid of any deposit of foreign matter from the top of the bed and at the same time break up the bed so that regeneration thereof may be more easily and effectively carried out. In the back wash, raw water is delivered through the pipe 47 and conducted through ports 44 and 64 and ports 60 and 42 to the pipe 51 leading to the bottom of the softener tank 50, so as to flow upwardly through the softener. The water discharged from the top of the softener through pipe 49, carrying with it the foreign matter, is discharged through ports 40 and 62, passage 65, and ports 63 and 41, to the drain pipe. During this operation, the port 69 is in communication with the port 45 so that raw water may be delivered to the service system. However, the seat ring 23′ for this port is internally threaded to receive a plug 70 to prevent raw water from getting into the service system. In other words, it is simply a matter of including the plug 70 where the customer prefers not to have raw water get into the service system; laundries, for example, find it most objectionable to allow any raw water to get into the service system, but in the average household, that is not considered objectionable. The seat ring 23′ for the port 46′ is similarly internally threaded to receive a plug 70*a* which has a small hole 70′ therein so as to allow water to flow under pressure from under the cover 12 through port 66 and port 46′ at a predetermined rate into the pipe 53′ to bring the level in the brine tank 55 up to a predetermined point. As a matter of fact, the operator will be instructed to allow the back wash to continue until enough water has been delivered to the brine tank to bring the level up to where it belongs, and in that way, the manufacturer of the water softener will be assured that the user will not cut short the back wash to an extent where the softener would not be properly regenerated by reason of the bed not being cleaned and properly broken up prior to the salt wash. Another advantage in this procedure is that it gets away from the objection of salt crystallizing on the side walls of the brine tank all the way to the top and over the outside, with a resultant waste in salt; in accordance with the present invention, the level in the brine tank is left so low throughout softening that whatever crystallization occurs on the side walls does not extend as high as the level to which water will be added during the back wash and in that way, all of the crystallized salt will be dissolved and used in the salt wash. The back wash is carried on for the proper time and then the lever 17 is operated to shift the valve a quarter turn in a clockwise direction to the No. 2 position (see Fig. 7) for what is known as the salt wash, or salting and rinsing. In this position, water is delivered under pressure from inside the cover 12 through the port 69 and port 46, thence through the injector 54 and pipe 49 to the top of the softener tank 50. Under these conditions, the port 63 being in communication with the port 42 and port 62 in communication with port 41, the bottom of the softener tank 50 is in direct communication with the drain 52, so that brine can be drawn from the tank 55 upon opening of the valve 57 and carried with the raw water for passage downwardly through the bed of water softening material to regenerate the same. Here again, raw water may be delivered to the service system by virtue of the fact that the port 60 is in communication with the port 43. However, I have provided a spring closed valve 71 on the plate 11 which will be opened each time the plate is seated provided there is a rod 72 in the port in the body 10 for unseating the valve. As disclosed in Fig. 3, such rods are provided only in the ports 40 and 42. In the port 43, a plug 73 is inserted in lieu of a rod 72 so as to allow the valve 71 to close the port 43 to shut off the flow of raw water to the service system during regeneration. Naturally, when a plug 70 is inserted in the port 45, a plug 73 will be inserted in the port 43 but if the port 45 is left open, it follows that a rod 72 will be provided in the port 43, or the valve 71 omitted, so as to leave port 43 uncovered during regeneration and allow raw water to flow into the service system. The salt wash is continued for a stated time or until a certain drop in level is noted in the brine tank, indicating that a certain amount of brine has been used sufficient for complete regeneration of the softener, whereupon the valve 57 is closed to shut off any further flow of brine. When there is no further flow of brine, it follows that the hard water can still flow through the injector 54 and pipe 49 into the top of the softener tank 50 so as to rinse the bed of water softening material and flush out any remaining brine and liberated calcium and magnesium. The rinse water leaving the bottom of the softener through the pipe 51 is, of course, conducted to the drain pipe. The valve is left in the No. 2 position long enough to complete the rinsing, after which the lever 17 is operated to shift the valve a quarter turn in a clockwise direction back to the original position which is No. 3, to resume softening operation.

The valve 71, mentioned above, has a stem 74 working in a guide 75 provided on the plate 11 at the center of a valve seat 76 which the valve 71 is arranged to engage. A yoke 77 is carried on the plate 11 to provide a guide for the other end of the valve stem, as indicated, and also provide an abutment for a coiled compression spring 78 bearing against the valve 71 and tending normally to seat the same. The rod 72 for unseating the valve 71 in the seating of the plate 71 is threaded in bosses 79 provided in the body. The threading of these rods in the body permits adjustment thereof to accordingly make the valve 71 open to a smaller or larger degree and thus regulate the flow through the valve. In that way, the valve 71 serves either as a shut-off valve or restriction valve. It is a simple matter to remove a rod 72 and substitute a plug 73, as in the case of the port 43, where the valve is too close. Then, too, where no shutting off or regulating of flow is desired as just described, the valve 71 may be omitted entirely. The valve 71 is a feature which makes the valve of my invention more adaptable to different requirements, as should be appreciated from the foregoing description.

When the plate 11 is unseated, a plunger 80 mounted on the inner end of the stem 15 is moved outwardly in a sleeve 81 having a press fit in the central port 44 in the body 10, whereby to close ports 82 and cut off the flow of water from the supply pipe 47 into the cover 12. In that way, there will not be any discharge of raw water through the drains 52 such as would otherwise occur. The saving in water is particularly worth while in large valve installations where the flow is proportionately greater. It is manifest that since the valve 80 is closed when the plate 11 is unseated and the drain pipe is at the same time placed in open communication with the inside of the cover 12, there is no pressure existing in the cover. However, at the commencement of the unseating operation, the full pressure of the line 47 is acting against the plate 11 and if its full area were seated on the body 10, it follows that it would take considerable force to unseat the same, but this difficulty is avoided in accordance with my invention by having the seat rings 23 and 23′ project from the body for engagement with the gaskets on the plate, whereby to leave the plate in spaced relation to the body when seated. It, therefore, takes a small fraction of the force that would otherwise be required to unseat the plate by means of the lever 17.

Figure 3:
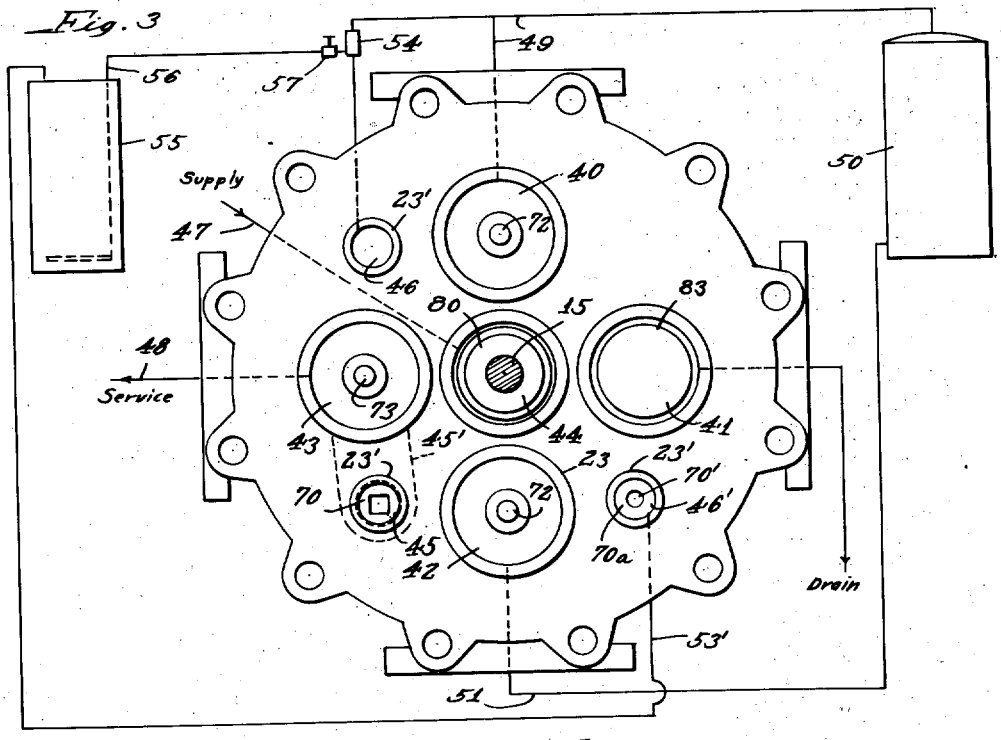
Fig. 3 is a cross-section of the valve in a transverse plane looking down upon the body so as to show the arrangement of valve seats.

It will be seen from Fig. 3 that the projecting seats are spaced from each other a substantial distance so that in the seated position of the stem plate fluid may flow from the port 44 laterally outward between the stem plate and the face of the body member and upward into the space above the plate, the construction allowing free circulation of the fluid around the seats. This acts not only to equalize the pressure of the fluid on opposite sides of the plate but increases the capacity of the valve. In other words, it enables me to keep the valve of small size and yet maintains full flow of fluid and avoids pressure loss in the valve.

Referring to Figure 1, it will be seen that I have provided an adjustable restriction valve 83 for regulating the flow through the port 41 communicating with the drain 52. This valve has a threaded stem adjustable in the threaded boss 79 and will be adjusted to regulate the flow, according to the pressure, through the softener 50 to whatever rate is considered proper for backwashing. A restriction valve such as the valve 83 may be provided in other ports besides the port 41. It may, for example, be used instead of the valve 71 for regulating the flow in softening operation, that is, when the valve 71 is omitted and cannot be used for regulating the flow for softening, as previously described.

In the use of the present valve in connection with a filter, the port 46′ would be plugged inasmuch as there would be no brine tank 55. The port 45 would be plugged only in the event the user preferred not to have raw water get into the service system, and in that event a plug 73 would also be used in the port 43 instead of a valve operating rod 72. The port 46 would be connected directly with the line 49 without any injector 54, there being no brine tank. Assuming for the present purpose that tank 50 is a filter, during filtering the raw water delivered through pipe 47 will be delivered through ports 60 and 40 to the pipe 49 for entry into the top of the filter. The filtered water leaving the bottom of the filter is delivered through pipe 51 and through ports 42 and 62, passages 65 and ports 63 and 43 to the service system through pipe 46. In back washing, the plate 11 is turned 180° so that the raw water is delivered to the bottom of the filter through pipe 51 and foreign matter is washed off the top of the bed in the filter through pipe 49 and conducted through ports 40 and 62, passage 65 and ports 63 and 41 to the drain pipe. During the back wash the port 69 will be in communication with the port 45 and if this port is not plugged it follows that raw water will be delivered to the service system. After the back wash, assuming no raw water has been allowed to enter the service system, it is desired to remove the raw water from under the filter bed, and for that reason the plate 11 is turned clockwise through 90° from the back wash position whereby to place the port 69 in communication with the port 46 so that raw water will be delivered to the top of the filter through pipe 49 for passage downwardly through the bed. The raw water is flushed out from the bottom of the filter by filtered water and is conducted through pipe 51 and ports 42 and 63, passage 65 and ports 62 and 41, to the drain pipe. Following this cperation, which may be termed a rinse, the plate 11 will be turned clockwise through another 90° back to the original position for filtering. It is apparent from this description how the present valve may be used interchangeably on water softeners and filters by virtue of its novel design and construction.

It is believed the foregoing description conveys a good understanding of all of the objects and advantages of my invention. The following claims have been drawn with a view to covering all legitimate modifications and adaptations.

I claim:

1. In a plate type valve, the combination of a ported body member, a ported stem plate for effecting different communication between the ports in the body member in different positions of the plate, a cover on the body member enclosing the plate and subject to internal pressure, projecting seats on the body member surrounding the ports thereof, gasket means on the plate surrounding the ports thereof and adapted for engagement with said seats when the plate is seated, the projecting seats being arranged to be impressed in the softer material of the gasket means for fluid tight seals while holding the plate in spaced relation to the body to maintain both sides of the plate subject to pressure for the purpose described, and means for unseating and reseating the plate.

2. In a plate type valve, the combination of a ported body member, a ported stem plate member adapted to effect different communication between the ports in the body member in different seated positions of the plate, a cover on the body member enclosing the plate, said cover having a pressure port communicating therewith, a separate projecting seat portion on one of said body and plate members surrounding each of the ports thereof and adapted to close communication between the ports in the body and plate when the plate is seated thereon, said projecting seat portions serving to hold the plate in spaced relation to the body member when seated to maintain both sides of the plate subject to pressure for the purpose described and means for unseating and reseating the plate.

3. In a plate type valve, the combination of a ported body member, a ported stem plate member adapted to effect different communication between the ports in the body member in different seated positions of the plate, a cover on the body member enclosing the plate, said cover having a pressure port communicating therewith, projecting seat portions on one of said body and plate members surrounding the ports thereof and adapted to close communication between the ports in the body and plate when the plate is seated thereon, said projecting seat portions serving to hold the plate in spaced relation to the body member when seated, means for unseating and reseating the plate, and a valve for automatically closing the pressure port when the plate is unseated.

4. In a plate type valve, the combination of a ported body member, a ported stem plate adapted to effect different communication between the ports in the body member in different positions of the plate, a cover on the body member enclosing the plate, said cover having a pressure port normally communicating with the inside thereof, means for unseating and reseating the plate to change communication between ports in the body member, and a valve for automatically closing the pressure port in the unseating of the plate.

5. In a plate type valve, the combination of a ported body member, a ported stem plate adapted to effect different communication between the ports in the body member in different positions of the plate, a cover on the body member enclosing the plate, said cover having a pressure port normally communicating with the inside thereof, means for shifting the plate to different operative positions, and means for closing the pressure port so that when the plate is being shifted there is no fluid flow from said port.

6. In a plate type valve, the combination of a ported body member, a ported stem plate adapted to effect different communication between the ports in the body member in different positions of the plate, a cover on the body member enclosing the plate, said cover having a pressure port normally communicating with the inside thereof, means for unseating and reseating the plate to change communication between ports in the body member, a valve for automatically closing the pressure port in the unseating of the plate, said plate having a port for establishing communication between the cover and other ports in the body member in different seated positions of the plate, a valve for automatically closing or opening said plate port, said valve tending normally to close, and means for automatically opening the valve in the seating of said plate in one or more positions.

7. In a plate type valve, the combination of a ported body member, a ported stem plate adapted to effect different communication between the ports in the body member in different positions of the plate, a cover on the body member enclosing the plate, means for shifting the plate to different operative positions, said plate having a port for establishing communication between the cover and other ports in the body member in different operative positions of of the plate, a valve for closing or opening said plate port, said valve tending normally to close, and means for automatically opening said valve in certain operative positions of the plate.

8. In a plate type valve, the combination of a ported body member, a ported stem plate adapted to effect different communication between the ports in the body member in different positions of the plate, a cover on the body member enclosing the plate, means for lifting and turning the plate to different operative positions, said plate having a port for establishing communication between the cover and other ports in the body member in different operative positions of the plate, a valve for closing or opening said port, said valve tending normally to close, and means in one or more of the body ports for automatically opening said valve when the plate is seated.

9. In a valve as set forth in claim 8 wherein the valve for closing the port in the plate includes a stem projecting toward said port, and wherein the means for automatically opening said valve comprises a push rod mounted in the body and projecting toward the body port and adapted to engage the end of the aforesaid valve stem in the seating of the plate.

10. In a valve, the combination of a multi-ported body member, a ported valve member rotatable to different operative positions to effect different communication between the ports in the body member, an operating stem projecting from said valve and adapted to unseat, rotate and reseat the valve, an operating lever having a clevis portion pivotally connected to the outer end of said stem on a transverse axis for unseating and reseating the valve by pivotal movement of the lever and rotate the valve by lateral movement, a swivel member rotatably supported on the body member, spring means on said swivel exerting pressure continuously on trunnions projecting laterally from the clevis whereby to hold the valve seated under spring pressure in one position of the lever, said trunnions being disposed at a predetermined radius with respect to the pivotal connection of the clevis with the valve stem, whereby to communicate unseating and seating movement to the valve by pivotal movement of the lever, and an abutment on the swivel member for engagement by the clevis in the unseated position of the valve, whereby to transmit the spring pressure to the body member when transferred from the valve, said swivel being adapted to be rotated with the valve stem by means of the lever in the lateral movement of the lever for rotating the valve from one position to another.

11. In a valve comprising a multi-ported body member, a ported valve member rotatable to different positions relative to the body member and adapted to be unseated prior to rotation from one position to another, a stem extending from the valve member for unseating, turning and reseating the same, spring means mounted on the body member and arranged to exert pressure on the valve stem to hold the valve seated, and an operable member for actuating the valve stem, said member being so related to the spring means and valve stem in one position thereof as to transmit the pressure of the spring means to the valve stem when the valve member is seated, but being arranged in another position to transmit the spring pressure to the body member.

12. In a valve comprising a multi-ported body member, a ported valve member rotatable to different operative positions relative to the body member and adapted to be unseated prior to rotation from one position to another, a stem extending from the valve member for unseating, turning and reseating the same, spring means mounted on the body member and arranged to exert pressure on the valve stem to hold the valve seated, an operable member for actuating the valve stem, said member being so related to the spring means and valve stem in one position thereof as to transmit the pressure of the spring means to the valve stem when the valve member is seated, but being arranged in another position to transmit the spring pressure to the body member, and means for preventing turning of the valve stem when said manually operable member is in the first-mentioned position, said valve stem being rotatable when the manually operable member is in the other position.

13. In a plate type valve, having two multiple port members, one member having individual gasket means around each of its ports and the other member having projecting seats around each of its ports, one member adapted to be moved, and means for unseating, turning and reseating the movable member.

14. In a plate type valve, having two multiple port members, one member having changeable gasket means around each of its ports, and the other member having changeable projecting seats around each of its ports, and means for moving one of the members to bring different ports together.

15. A lift-turn valve comprising stator and rotor parts having ports arranged to register in different operative positions of the rotor relative to the stator, said rotor being liftable relative to the stator, said stator having an inlet, and valve means liftable with the rotor for automatically closing said inlet when the rotor is to be shifted from one operative position to another.

16. A lift-turn valve comprising stator and rotor parts having ports arranged to register in different operative positions of the rotor relative to the stator, said rotor being liftable relative to the stator, said stator having an axial passage provided with a radial inlet port through which all fluid flow through the valve occurs, and a plunger valve in said passage liftable with the rotor for automatically closing said inlet port when the rotor is being shifted from one operative position to another.

17. A valve comprising stator and rotor members having ports arranged to register in different operative positions of the rotor relative to the stator, a valve for closing and opening one of the rotor ports, means for lifting, turning, and reseating the rotor in the shifting thereof from one position to another, and means whereby the position of the last-mentioned valve is determined in the reseating of the rotor.

18. A valve comprising stator and rotor members having ports arranged to register in different operative positions of the rotor relative to the stator, a valve for closing and opening one of the rotor ports, means for lifting, turning, and reseating the rotor in the shifting thereof from one position to another, means whereby the position of the last-mentioned valve is determined in the reseating of the rotor, an inlet providing pressure communicating with the rotor and valve means for automatically closing said inlet while the rotor is elevated.

19. A valve comprising stator and rotor parts having ports arranged to register in different operative positions of the rotor relative to the stator, an inlet providing pressure communicating with the rotor, valve means for automatically closing said inlet when the rotor is to be shifted from one operative position to another, a valve for closing and opening one of the rotor ports, and means whereby said valve is opened in one operative positon of the rotor and closed in another.

20. A valve comprising stator and rotor parts having ports arranged to register in different operative positions of the rotor relative to the stator, an inlet providing pressure communicating with the rotor, valve means for automatically closing said inlet when the rotor is to be shifted from one operative position to another, and a restriction valve threadedly mounted in the stator for adjustment toward and away from one of the stator ports, whereby to regulate the fluid flow in at least one of the positions of the rotor, said restriction valve having a portion thereof accessible from the outside of the stator for adjustment purposes.

21. A valve comprising stator and rotor members having ports arranged to register in different operative positions of the rotor relative to the stator, a valve for closing and opening one of the rotor ports, means on the stator for operating the valve whereby said valve is opened in one operative position of the rotor and closed in another, and a restriction valve threadedly mounted in the stator for adjustment toward and away from one of the stator ports, whereby to regulate the fluid flow in at least one of the positions of the rotor, said restriction valve having a portion thereof accessible from the outside of the stator for adjustment purposes.

22. A valve comprising stator and rotor members having ports arranged to register in different operative positions of the rotor relative to the stator, a valve for closing and opening one of the rotor ports, means for lifting, turning, and reseating the rotor in the shifting thereof from one position to another, means whereby the position of the last-mentioned valve is determined in the reseating of the rotor, said stator having an inlet, valve means for automatically closing said inlet while the rotor is elevated, and a restriction valve threadedly mounted in the stator for adjustment toward and away from one of the stator ports, whereby to regulate the fluid flow in at least one of the positions of the rotor, said restriction valve having a portion thereof accessible from the outside of the stator for adjustment purposes.

23. A valve comprising stator and rotor parts having ports arranged to register in different operative positions of the rotor relative to the stator, an inlet providing pressure communicating with the rotor, valve means for automatically closing said inlet when the rotor is to be shifted from one operative position to another, a valve for closing and opening one of the rotor ports, means whereby said valve is opened in one operative position of the rotor and closed in another, and a restriction valve threadedly mounted in the stator for adjustment toward and away from one of the stator ports, whereby to regulate the fluid flow in at least one of the positions of the rotor, said restriction valve having a portion thereof accessible from the outside of the stator for adjustment purposes.

24. A valve comprising stator and rotor parts having ports arranged to register in different operative positions of the rotor relative to the stator, whereby to secure different fluid circuits through the valve, said stator having a plurality of outlets and a restriction valve threadedly mounted in the stator for adjustment toward and away from one of the outlet ports therein, whereby to accordingly regulate the fluid flow in at least one of the positions of the rotor, said restriction valve having a portion thereof accessible from the outside of the stator for adjustment purposes.

25. In a plate type valve, the combination of a ported body member, a cover on the body member providing a chamber therein subject to fluid pressure from an inlet port, a ported stem plate within the cover for effecting different communication between the ports in the body member in different seated positions of the plate, means holding the plate in spaced relation to the body while seated whereby to maintain both sides of the plate subject to pressure, for the purpose described, means for unseating and reseating the plate, and means for automatically closing the pressure port in the body when the plate is unseated.

26. A plate type valve combining a ported body member, a ported stem plate for effecting different communication between the ports in the body member in different positions of the plate, means for unseating, rotating and reseating said plate, a valve for closing and opening one of the ports in said plate, said valve tending normally to move in one direction, and means for automatically moving the valve in the other direction in one or more positions of rotation of the plate.

27. A plate type valve combining a ported body member, a ported stem plate member for effecting different communication between the ports in the body member in different positions of the plate member, means for unseating, rotating and reseating said plate member, a valve for closing and opening one of the ports in one of said body and plate members, said valve tending normally to move in one direction, and means on the other of said members for automatically moving the valve in the opposite direction in one or more positions of the plate member.

28. A plate type valve comprising a ported body member, a ported stem plate for effecting different communication between the ports in the body member in different positions of the plate, means for turning said plate from one position to another, a valve for closing and opening one of the ports in said plate, and an operator for the latter valve threadedly mounted in the body member for adjustment relative to one of the ports in the body member, whereby to open the valve in a certain position of the plate to an extent determined by the adjustment of said operator and accordingly regulate the fluid flow, said operator having a portion thereof accessible from the outside of the body member for adjustment purposes.

29. A valve as set forth in claim 28, including a restriction valve threadedly mounted in the body member for adjustment toward and away from another port in the body member, whereby to regulate the fluid flow in at least one of the positions of the plate, said restriction valve having a portion thereof accessible from the outside of the body member for adjustment purposes.

30. In a plate type valve comprising two multiple port members, one member having individual gasket means around each of its ports and the other member having seat means around each of its ports, one of the two last mentioned means, projecting from the associated member whereby to hold the members in spaced relation to one another when seated, one of said members being adapted to be moved, and means for unseating, turning and reseating the movable member.

31. In a plate type valve comprising two multiple port members, ported gasket means on one of said members, individual rings surrounding the ports of said member and serving to secure the gasket means to the face thereof, the other member having seats around its ports arranged to engage the gasket means, one of said members being adapted to be moved, and means for unseating, turning and reseating the movable member.

32. A plate type valve comprising a ported body member, a ported stem plate for effecting different communication between the ports in the body member in different positions of the plate, means for turning said plate from one position to another, a valve for closing and opening one of the ports in said plate, and a plurality of operators for the last-mentioned valve threadedly mounted in the body member for adjustment relative to ports in said body member, whereby said valve is arranged to be opened in certain positions of the plate to the extent determined by the adjustment of said operators and accordingly regulate the fluid flow, said operators each having a portion thereof accessible from the outside of the body member for adjustment purposes.

33. In a multi-port valve, the combination of a ported body member, a ported rotor member for effecting different communication between the ports in the body member in different postions of the rotor member, a cover on the body member enclosing the rotor member and subject to internal pressure, spaced individual projecting seats on the body member surrounding the ports thereof, and gasket means on the rotor member surrounding the ports thereof and adapted for engagement with said seats when the rotor member is seated, the projecting seats being arranged to be compressed in the softer material of the gasket means for fluid tight seals while holding the rotor member in spaced relation to the body to maintain both sides of the plate subject to pressure.

34. In a multi-port valve, a stationary multi-port member, a multi-port member rotatable for changing the port communications therebetween, a soft rubber ported gasket secured to the face of one of said members, projecting seats on the other of said members for contact with said gasket providing space therebetween for the free flow of fluid laterally between the members, and means for moving one of said members to bring different ports into communication.

35. In a lift-turn multi-port valve, a stationary multi-port member, a multi-port member adapted to be lifted and then rotated for changing the port communication therebetween, a soft rubber ported gasket secured to the face of one of said members, individual projecting seats on the other of said members for contact with said gasket providing space therebetween and between said seats for the free flow of fluid laterally between the members, and means for first lifting and then rotating one of said members to bring different ports into communication.

LEE G. DANIELS.